United States Patent [19]
McAllister et al.

[11] Patent Number: 5,771,273
[45] Date of Patent: Jun. 23, 1998

[54] NETWORK ACCESSED PERSONAL SECRETARY

[75] Inventors: Alexander I. McAllister, Kensington; Laird Wise, Ellicott City, both of Md.; James E. Curry, Herndon; Robert D. Farris, Sterling, both of Va.

[73] Assignee: Bell Atlantic Network Services, Inc., Arlington, Va.

[21] Appl. No.: 596,657

[22] Filed: Feb. 5, 1996

[51] Int. Cl.$^6$ .................................................. H04M 3/44
[52] U.S. Cl. ............................. 379/67; 379/88; 379/214; 379/216; 379/202
[58] Field of Search ................................. 379/67, 88, 89, 379/202, 355, 201, 214, 216

[56] References Cited

U.S. PATENT DOCUMENTS

| | | | |
|---|---|---|---|
| 4,348,550 | 9/1982 | Priz et al. ................................... | 379/88 |
| 4,945,570 | 7/1990 | Gerson et al. . | |
| 4,969,136 | 11/1990 | Chamberlin et al. . | |
| 4,975,896 | 12/1990 | D'Agosto, III et al. . | |
| 5,093,854 | 3/1992 | Sucato ....................................... | 379/67 |
| 5,131,024 | 7/1992 | Pugh et al. ................................. | 379/67 |
| 5,181,238 | 1/1993 | Medamana et al. . | |
| 5,208,848 | 5/1993 | Pula .......................................... | 379/67 |
| 5,315,649 | 5/1994 | Foster et al. ............................. | 379/355 |
| 5,384,832 | 1/1995 | Zimmerman et al. .................... | 379/67 |
| 5,396,542 | 3/1995 | Alger et al. .............................. | 379/67 |
| 5,430,791 | 7/1995 | Feit et al. ................................. | 379/67 |
| 5,434,908 | 7/1995 | Klein ........................................ | 379/88 |
| 5,434,909 | 7/1995 | Price et al. ............................... | 379/88 |
| 5,479,491 | 12/1995 | Herrero Garcia et al. ............... | 379/88 |
| 5,483,579 | 1/1996 | Stogel ...................................... | 379/88 |

*Primary Examiner*—Ahmad F. Matar
*Attorney, Agent, or Firm*—McDermott, Will & Emery

[57] ABSTRACT

A method and system is disclosed for accessing a remote personalized secretarial platform that permits a wide variety of functions with high flexibility, while being easily usable by an individual telephone subscriber. The platform can be accessed whenever the subscriber telephone is off-hook through a voice recognition monitor that monitors the subscriber line and is responsive to a preselected utterance to generate an access signal. Placed at the telephone switch facility, a monitor module is speech responsive individually to a plurality of lines that are off hook to generate signals that effect switch functions including bridging to the platform and modifying a subscriber switch feature profile.

34 Claims, 5 Drawing Sheets

NETWORK ACCESSED PERSONAL SECRETARY

TECHNICAL FIELD

The present invention relates to a telephone network including a processing platform that provides secretarial functions individually for each subscriber.

BACKGROUND ART

The evolution of telephone network capabilities has provided enhanced call routing and completion functions and, in recent years, new and varied information communication services. The advent of the intelligent network and access to intelligent peripheral elements have enabled subscribers to obtain assistance, through remote connection to relatively sophisticated processing units, in performing tasks that formerly could be done only by human operation.

An example of a network having intelligent capability is disclosed in the commonly assigned U.S. Pat. No. 5,572,583 issued May 11, 1996, hereby incorporated by reference. Proposals also have been made to add nodes to the telephone network, either separate from or associated with the switching offices, to provide announcements and related enhanced service features. For example, U.S. Pat. No. 5,131,024 to Pugh et al. discloses telephone systems in which a variety of caller-controlled proactive services are provided after a caller has been connected to a called station. A passive in-line monitor detects entry of a predetermined service access code by a user of the calling station or a user of the called station. Upon entry of the code, a speech circuit of the apparatus issues a predetermined prompt to the user of the calling station and/or the called station. Processor control circuitry of the apparatus is then responsive to entry of predetermined signaling by one of the users following the issuance of the prompt for providing a predetermined service controlled and paid for by the user requesting the predetermined service.

U.S. Pat. No. 5,208,848 to Pula, discloses establishing telecommunication calls by utilizing an intelligent peripheral that is bridged to a call being dialed. If the intelligent peripheral recognizes a need to supply information for establishing a call, or for signaling a customer request, the intelligent peripheral supplies digits or characters on the customer's behalf for use by the switch. The peripheral optionally has speech recognition apparatus for interpreting customer requests and supplying the digits needed to implement that request.

U.S. Pat. No. 5,434,909 to Price et al., discloses a voice mail system that allows the subscriber to receive a stored message and to create a direct connection to a selected called party without exiting the voice mail system. The subscriber calling party is returned to that point in the system where the calling party may listen to a second message stored in the system. In addition, the subscriber calling party may deliver a voice message to another subscribing party using a rapid call delivery option. Under a rapid delivery option, a subscriber calling party leaves a message with the system, the system then both deposits the message with the voice mailbox of the subscriber called party while simultaneously attempting to deliver the message via the establishment of a direct connection to the called party's telephone.

Other enhanced telecommunication service arrangements provide processing apparatus local to the subscriber site either in direct connection to a subscriber telephone or part of a local area network, such as a subscriber PBX system. U.S. Pat. No. 4,969,136 to Chamberlin et al. and U.S. Pat. No. 4,975,896 to D'Agosto, III et al., disclose a telephone/dictation network that provides computerized appointment storage, retrieval and reminders. Daily, weekly and monthly appointment calendars are provided for every user of the network. The user is given a reminder message through the network at a predetermined time prior to the appointment. Appointment schedules for current, prior and future time periods can be viewed on a display at the telephone instrument.

A personal computer operates with the network and stores in its memory appointments for each network transceiver unit. The appointments for each unit are arranged in lists for each day or week or month. It is possible to review the lists for the current period as well as preceding and future periods of time. Additional features include central dictation actuation, telephone line selection, telephone voice message recording, dial-out inhibiting, delayer ringing, message transmission, voice recognition, data transfer and programmable soft keys.

U.S. Pat. No. 5,093,854 to Sucato discloses a telephone actuated calendar which provides audible appointment reminders in response to dialed digits representing a calendar day of the week. This reminder prevents the user from further scheduling any conflicting functions for that particular day. The user can also record the schedule for any particular function into the calendar. The device can provide such reminders to a number of users. A series of storage units are each similar to an answering machine, for recording and playing back voice information over a telephone line, and correspond individually to one day of the calendar year. The code dialed in by the user identifying a calendar day causes the system to connect the user's call to the corresponding one of the storage units. The system can thus provide reminders of scheduled events in response to incoming calls.

U.S. Pat. No. 5,384,832 to Zimmerman et al. discloses a local telephone message announcing device that automatically checks a remote telephone voice messaging system for stored messages, announces the presence of stored messages through an external indicator and automatically connects the user to the stored messages upon entry of a predetermined command by the user. The device checks for the stored messages by detecting a unique tone sent to a user's telephone set or telephone number by the remote telephone voice messaging system to indicate the presence of stored messages. The detection occurs at predetermined time intervals whereby interference with the operation of the local telephone set is minimized.

A subscriber seeking to choose from among various available arrangements such as those described above, generally must weigh the benefits or degree of sophistication and variety of offered features against cost and ease of use. A unit that connects as an adjunct to an individual's telephone will be limited in the degree of service enhancements and must be purchased. A more robust subscriber system, such as a PBX arrangement, is useful for a plurality of individual telephone stations in a system, but would not be practicable to a subscriber having a single or, at most, only a few telephones. In either case, the subscriber would be responsible for installing and maintaining the system and, in some circumstances, hiring a system operator.

Systems provided remotely through the telephone network, while generally sophisticated in nature, tend to be complicated in actual use. Moreover, maintaining such a system constantly on-line is expensive as well as allocating resources unnecessarily.

The need exists for such systems to be oriented more to the personal needs of the subscriber as well as easy to activate and operate. A subscriber using a network to form the functions of a personal secretary should be able to have the service customized to the subscriber's individual needs, such as easy access to the system for receiving messages, maintaining a calendar, scheduling appointments, and arranging calls to one or more parties. Such functions should be available to the subscriber without the need to memorize a complicated assortment of command procedures. Currently available systems are limited in flexibility to the switch features that have been programmed into the switch prior to placement of a telephone call. Thus, switch hook features to which a calling party has not subscribed, for example conference calling, would not be available to that party for use during an ongoing call. To overcome this difficulty, the need exists for the capability to easily change the programmed switch features after a call has been connected to a dialed destination.

DISCLOSURE OF THE INVENTION

The present invention meets the needs described above by providing remotely, through the telephone switched network, a personalized secretarial platform that permits a wide variety of functions with high flexibility, while being easily usable by an individual subscriber. The platform is available to be accessed by the subscriber whenever the subscriber telephone is off-hook to act as a personal secretary or intelligent agent. Speech recognition means are placed to monitor the subscriber line and be responsive to a preselected utterance to generate a signal to access the platform. The invention provides an inexpensive, efficient method and system of accessing an intelligent peripheral unit through the Public Switched Network via voice commands.

The utterance to which the speech recognizer responds can be any convenient word or phrase that may be associated with an individual subscriber line or a unique word, such as "audissey", that is applicable in common to several subscribers. The signal generated by the speech recognition means is received at the central office switch associated with the subscriber line and acts as a "wake up" signal for bridging the subscriber line with the service platform. The subscriber may immediately go off hook and, over the dial tone, utter the appropriate phrase to effect connection of the line with the service platform. Alternatively, during an ongoing phone call, in which the subscriber is connected with another party, the subscriber can utter the appropriate phrase and bridge the call to the platform as a three way connection.

When so connected, the platform is active to perform functions for the subscriber such as relaying voice and fax messages, maintaining a calendar and event scheduler that is reviewable on request, setting up conference calls, and dialing calls to specific destinations. The platform contains voice interactivity capability whereby, through speech synthesis, requested information may be supplied from the platform by speech and transmitted to the subscriber or a speech menu may be provided that indicates service options to the subscriber. The platform contains a robust speech recognition capability so that it can be responsive to the subscriber's spoken commands or to DTMF signals input by the subscriber.

The activating voice recognition means, in one arrangement of the invention, is a device that may include any of a number of commercially available, relatively simple chips that can recognize a limited, speaker independent, vocabulary. The device is located in each subscriber line, connected between the telephone instrument and the central office switch. In response to recognition of one of the vocabulary utterances, such as the word "audissey," the device generates a signal that causes the switch at the central office to connect the line with the service platform. In response to recognition of another of the limited vocabulary, such as the command "conference call," the device generates a signal that causes the switch to activate the conference call feature, if such feature has been stored in the switch translation table.

In another arrangement of the invention, the voice recognition means is located at the central office rather than in each subscriber line. The device is part of an administration monitor unit capable of individually monitoring all subscriber lines and generating appropriate signaling in response to recognized utterances. Thus, at any time, the unit can signal the switch to bridge a subscriber line to the service platform or perform a switch function to which the line is subscribed. A further advantage of this arrangement is that the unit can be set to recognize an uttered instruction for a feature that has not been presubscribed. For example, a subscriber may not be enrolled in three way calling and, thus, such feature is not set in the switch translation table for that line. In response to detection of the utterance "three way calling," or the like, the unit will generate signals to the switch SSP to change the temporary switch translation table store for the current call to include the three way calling feature. At any time thereafter until the subscriber line goes to an on-hook condition, detection of the appropriate spoken command will activate the conference calling feature. The invention thus provides a dynamic line translation function that renders the service extremely flexible.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODES FOR CARRYING OUT THE INVENTION

Figure 1:
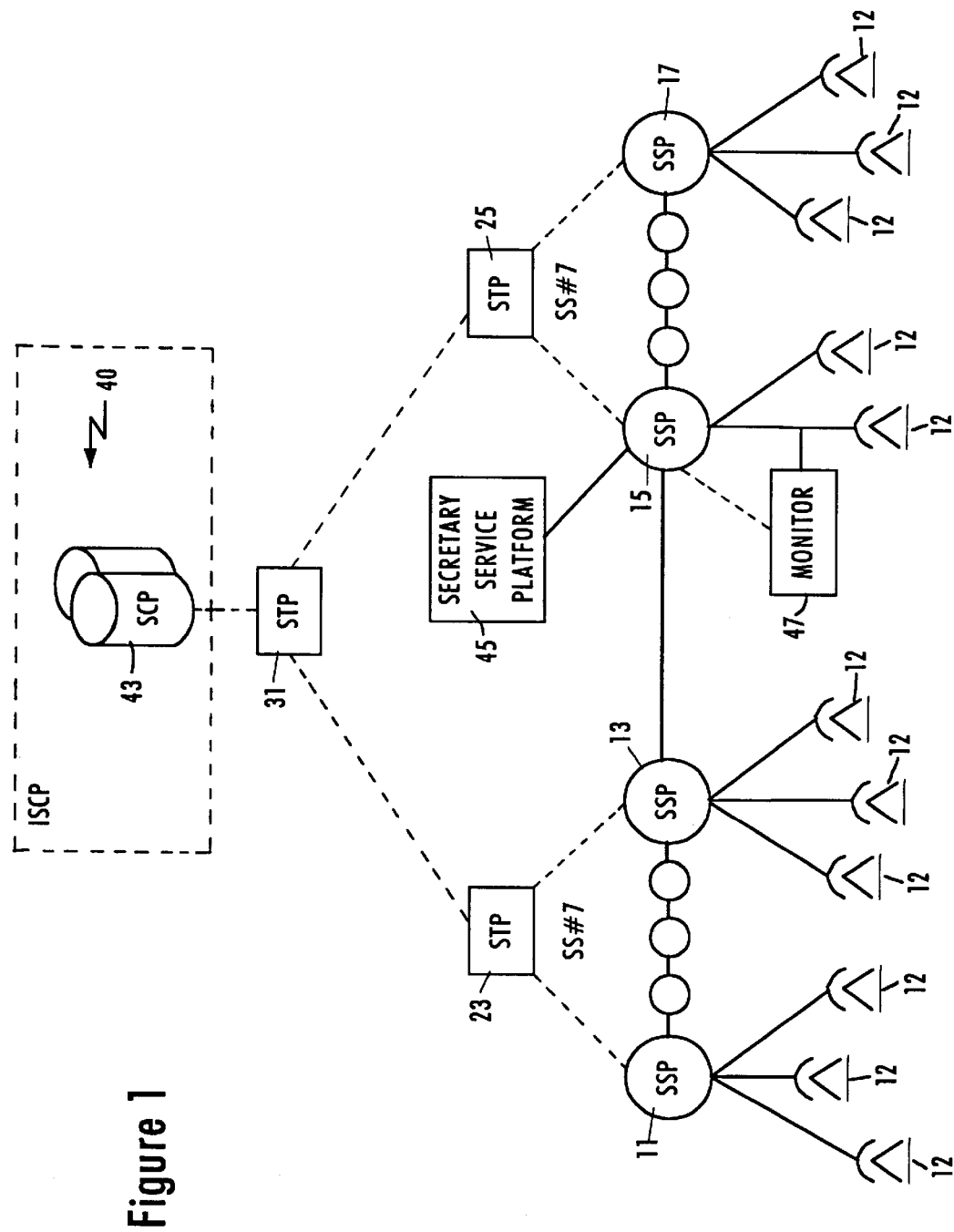
FIG. 1 is a block diagram of the present invention in the context of an Advanced Intelligent Network (AIN).

FIG. 1 depicts the invention in an AIN architectural environment. Rather than complicate the drawing with all details of the AIN network that are well known, functional blocks are represented for description of the network as it relates to the present invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. As well known, the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Siemens, manufacture comparable digital switches that may serve as the SSP's. The structure of an exemplary SSP type CO is discussed in more detail below, with regard to FIG. 2.

The SSP type COs 11 and 13 are shown connected to a first local area STP 23, SSP-COs 15 and 17 being connected to a second local area STP 25. The connections to the STPs are for signalling purposes. Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSP's or not, may function primarily as tandem type offices providing connections between trunk circuits only.

The local area STPs 23 and 25, and any number of other such local area STP's (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches.

The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

The messages transmitted between the SSPs and the ISCP are formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the aforementioned U.S. Pat. No. 5,572,583 for a more detailed description of the AIN network.

The secretary service platform 45 is shown connected to SSP 15. Such connection may be made via T1 or ISDN PRI lines. As illustrated, the platform is a stand alone multiservice platform allocated to serve the SSP 15. Although not shown in the drawing, other such platforms can be provided for servicing respective SSPs. Alternatively, the platform can be an intelligent peripheral (IP) having resources that are shared for the personal secretary functions as well as other subscriber functions. A platform may serve a plurality of SSPs by direct connection to each SSP by T1 or ISDN PRI lines, multiservice platform or a shared resource of an IP platform.

Monitor 47, which contains a voice recognition chip, is connected to monitor a subscriber line when telephone 12 is in its off-hook state. A signaling connection extends from the monitor to SSP 15. In response to detection of a predetermined utterance by the subscriber, such as the word "audissey" the chip will generate an activation signal that is fed to the SSP. Scanning of this signal at the SSP will result in connection through a conference bridge of the line with the service platform 45. Further description of platform 45 and monitor 47 is set forth below.

Figure 2:
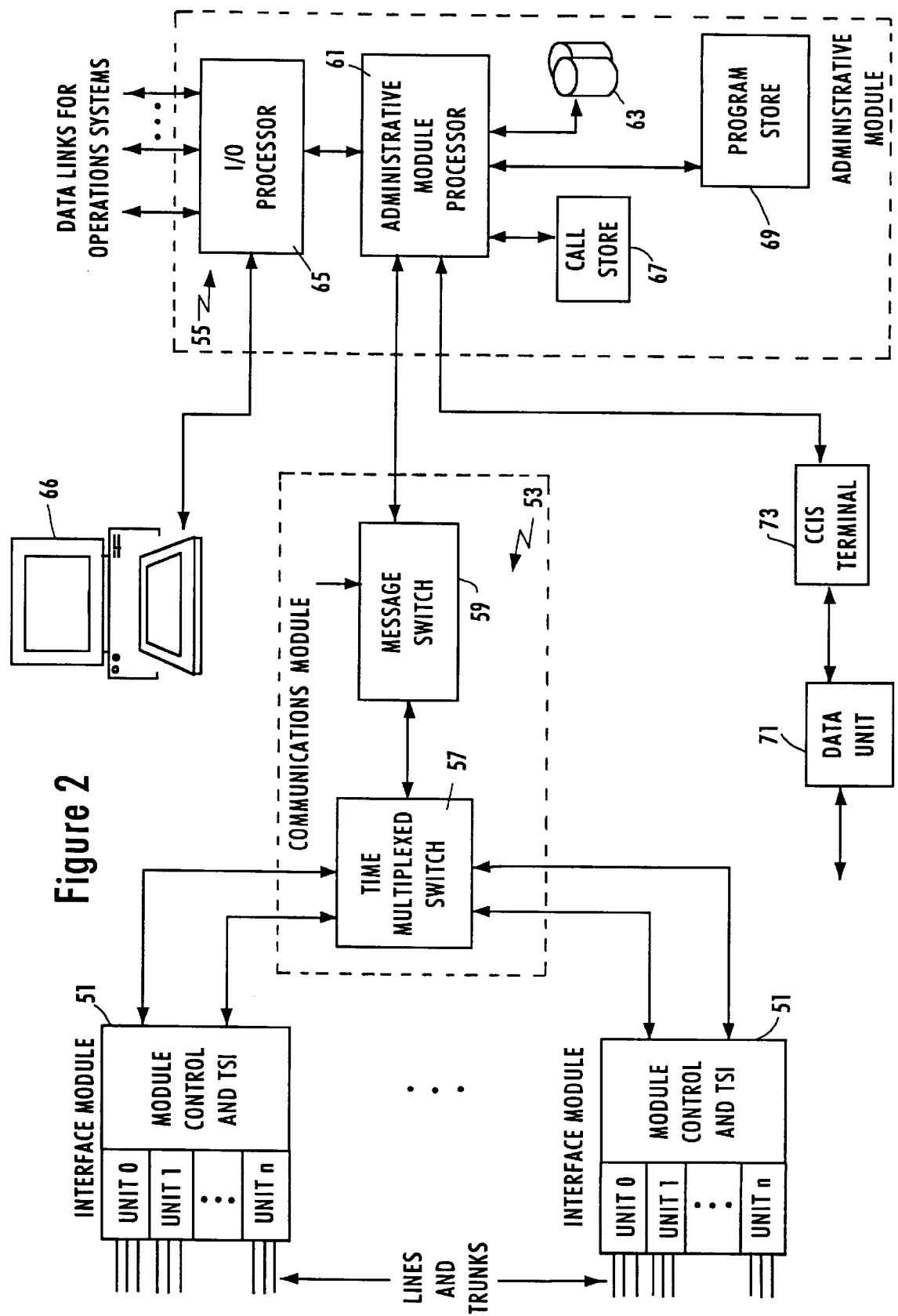
FIG. 2 is a more detailed diagram of one of the SSP type central offices used in the preferred AIN implementation of the present invention.

FIG. 2 is a simplified block diagram of an electronic program controlled switch which may be used as any one of the SSP type COs in the system of FIG. 1. As illustrated, the CO switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc., that are physically wired to a main distribution frame (not shown) in the central office. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example, a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS#7 network connection to an STP or the like, as shown in FIG. 1, for facilitating call processing signal communications with other COs and with the ISCP 40.

The administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. Translation tables, including subscribed class features are loaded into the store with each call. The program store 69 stores program instructions which direct operations of the computer serving as the administrative module processor.

The secretary service platform, represented in FIG. 1, is connected to the associated SSP switch preferably via a primary rate Integrated Services Digital Network (ISDN) link through an appropriate interface unit in one of the interface modules 51 of the switch. The ISDN link carries both voice and signaling data. While only a single platform has been shown in FIG. 1 for ease of illustration, a similar platform may be connected to each of SSPs 11, 13 and 17 if indicated by volume of use and space considerations.

Similarly, only a single voice monitor 47 has been shown in FIG. 1. In practice a plurality of such monitors, one for each subscriber line, will be used in the embodiment of FIG. 1. While the voice monitor may bridge the line at any convenient location, the monitors for all subscribers served by an SSP will be banked at the central office and connected at the line side of the associated interface module 51. The voice monitor output signal, generated in response to recognition of a stored vocabulary word, is transmitted to the administrative module to communicate to the switch that the line is to be bridged to the service platform. The received signal may be entered into the call store, which is scanned continuously by the module processor for processing information.

Figure 3:
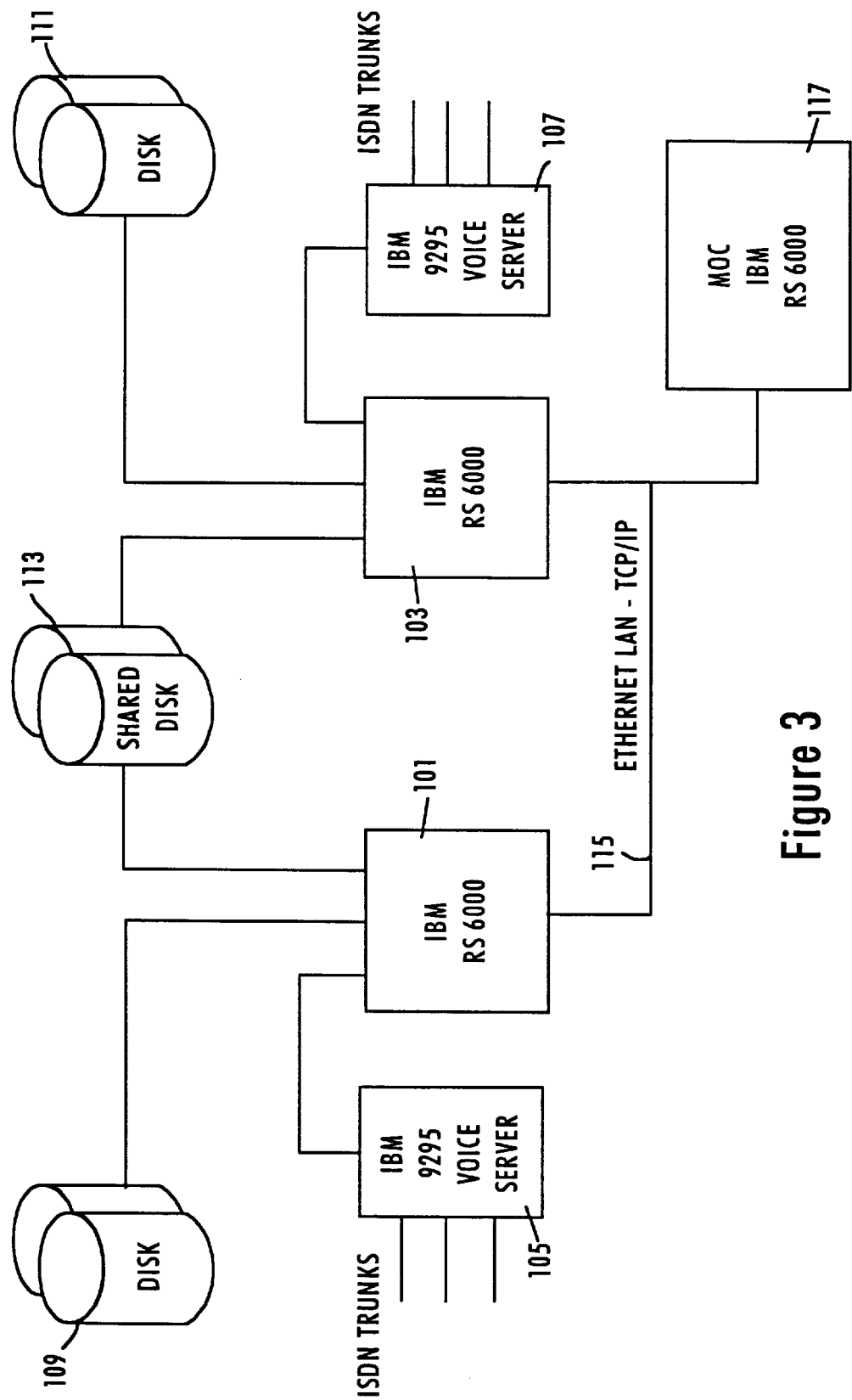
FIG. 3 is a block diagram of an Intelligent Peripheral unit according to the present invention that may provide the functions of the secretary service platform shown in FIG. 1.

The secretary service platform 45 of FIG. 1, may comprise any of several arrangements. The block diagram of FIG. 3 represents one such arrangement, an Intelligent Peripheral (IP). The IP includes two or more general purpose computers 101, 103, such as IBM RS-6000's. Each general purpose computer contains a digital voice processing card for sending and receiving speech and other audio frequency signals, such as an IBM D-talk 600. Of course, other commercially available components comparable to the identified IBM units may be used in lieu thereof.

Each voice processing card is connected to a voice server card 105 or 107, which provides the actual interface to T1 or primary rate interface ISDN trunks to the SSP type switching office. The plurality of computers may have associated dedicated disk storage 109, 111, while a shared disk memory 113 also is provided. Each computer includes an interface card for providing two-way communications over an internal data communications system, an Ethernet type local area network 115. The Ethernet carries communications between the individual computers and between the computers and may further be linked to a router, not shown, which provides access to additional signalling communications networks. The IP also includes another general purpose computer 117 configured as a terminal subsystem, for use as a maintenance and operations center (MOC) that provides access to the IP to operations personnel. The number of processors provided in the IP and the number of voice servers will depend on project service demands. An additional processor and associated voice server may be provided as a backup.

Each general purpose computer 101, 103 will run a node manager, an IP/ISCP Interface program, appropriate voice processing software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. The general purpose computers and associated circuits will also run a variety of other types of service program modules, for example a voice mail server module and/or a fax mail server module. Such modules may operate as general mail servers or poll subscribers mail services and receive therefrom stored messages. The formats of the messages can be converted to text, speech or other formats that can be transmitted to the subscriber at the subscriber's discretion.

Figure 4:
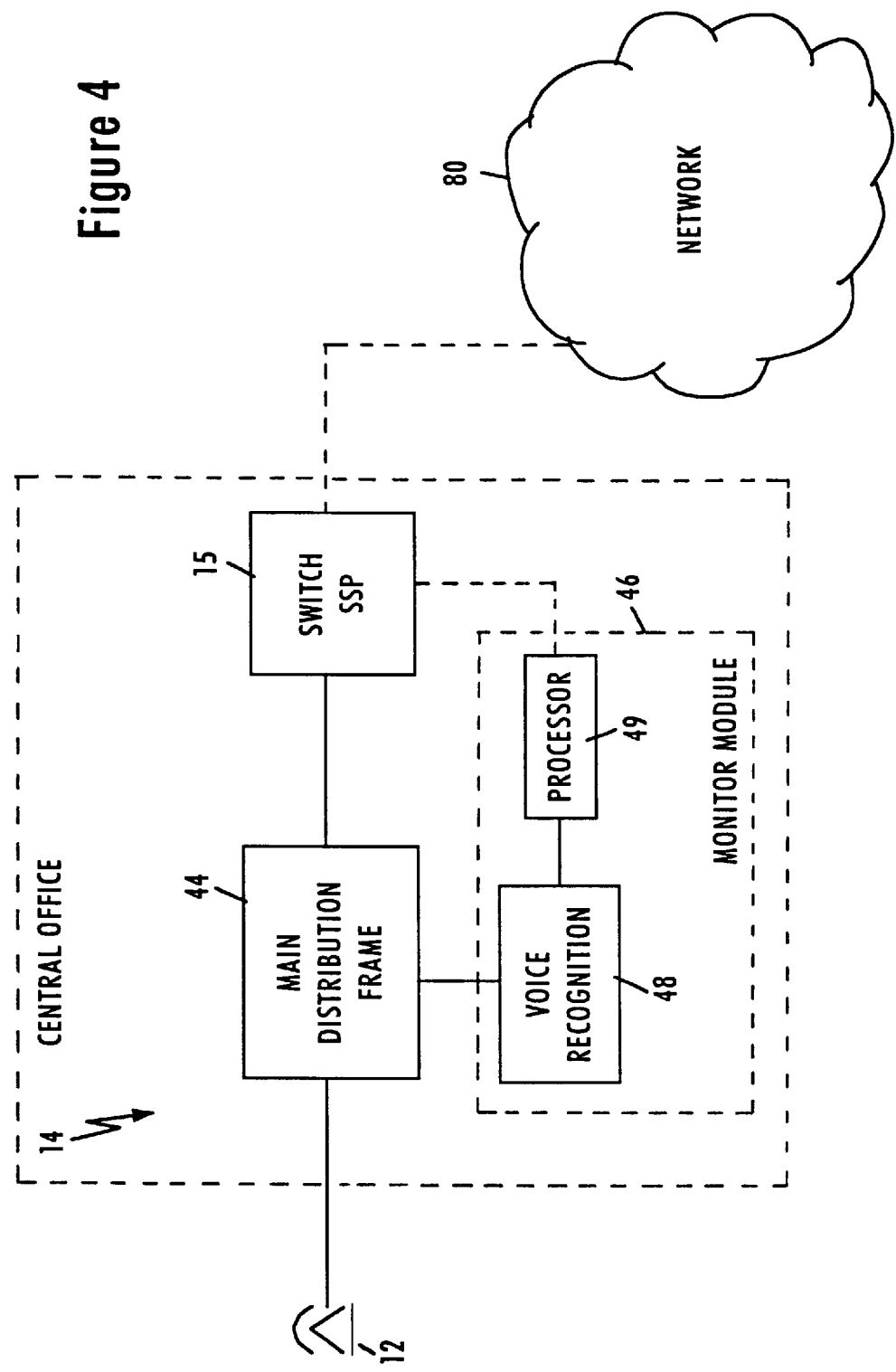
FIG. 4 is a block diagram of an alternative preferred embodiment.

FIG. 4 is a block diagram of an alternative preferred embodiment. Elements that correspond to those illustrated previously are labelled with the same reference numerals. A Central Office, generally indicated as 14, is connected via subscriber lines from main distribution frame 44 to customer premises, only a single subscriber telephone instrument 12 being represented for ease of illustration. Within the Central Office, the main distribution frame is connected to the electronic controlled switch, such as illustrated in more detail in FIG. 2, described previously. The switch and SSP functionality are shown generally at block 15. The SSP is connected to AIN network 80 in the manner illustrated in FIG. 1.

Monitor module 46 is wired to the main distribution frame 44 and has an output data link to the administrative module of the SSP. The monitor module contains one or more voice recognition chips, indicated generally by block 48, and a processor 49. The module stores a limited vocabulary of words. The term "vocabulary word" is to be taken in a broad sense to include a predetermined string of phoneme utterances that may comprise an actual word, phrase or other unique combination of sounds. In response to recognition of a monitored vocabulary word, a signal is generated by the module and output to the data link to effect a change at the switch, such as adding a switch class feature to the stored subscriber profile or connecting the subscriber line to the personal secretary platform.

As the module is wired to the main distribution frame it can monitor all subscriber lines, thus eliminating the need to use a separate monitor in each line, as in the arrangement of FIG. 1. The identification of each monitored line is maintained in the module processor. The signal generated by the processor can be either of a protocol specific to the particular switch embodied in the SSP (such as a 5ESS) or of a network protocol. For example, the processor can generate a TCAP message that identifies the subscriber line and indicates a switch class feature to be added or a bridge connection to be made.

The module can be set to monitor speech signals on a subscriber line that originate from the subscriber station alone or from all stations that are bridged with the subscriber line during a call. The secretary service functions thus may be made selectively available either to only the subscriber or to all parties to a call. In the latter setup, a subscriber may access the secretary service platform from a remote location by calling his subscriber line. To avoid unauthorized third party use, a PIN procedure is invoked when a personal secretary service "wake-up" phrase is uttered at a remote calling station. The monitor module, recognizing this condition, will include information in a message signaled to the SSP to initiate a PIN authorization interactive session with the caller prior to accessing the personal secretary services. The generated monitor signal, for example, may include a designated bit set high or low as an indicator. The PIN authorization procedure may be performed at the SSP, in the same manner commonly used for credit card authorization calls, or may be incorporated as the initial portion of the personal secretary service platform interactive session.

Figure 5:
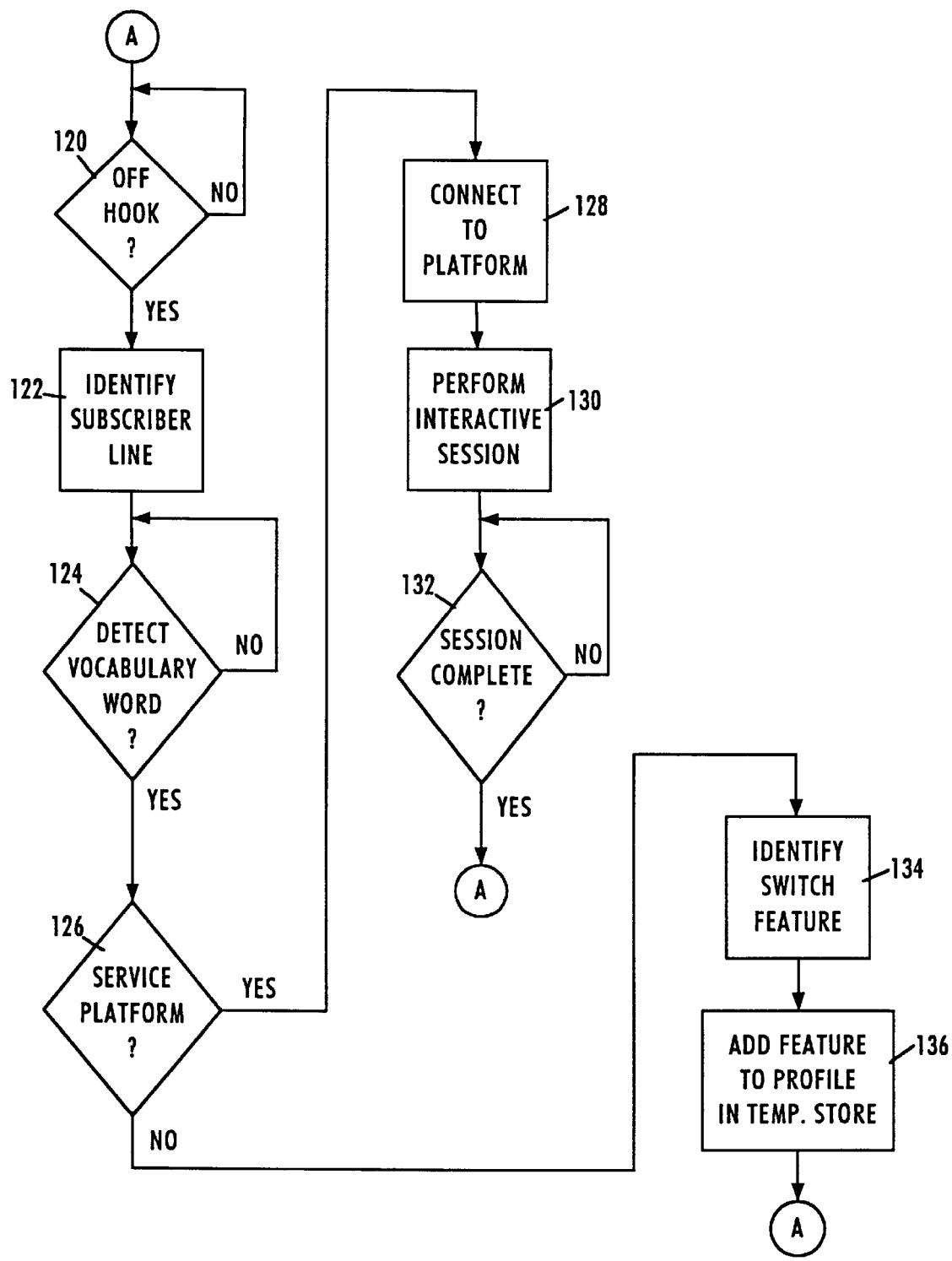
FIG. 5 is a flow chart of the operation of the invention of FIGS. 1 and 4.

FIG. 5 is a flow chart that exemplifies operation of the invention with either the arrangement of FIG. 1 or FIG. 4. When a subscriber initially goes off hook, a translation table containing the profile of the subscribed class features for the line is retrieved from permanent storage 63 (FIG. 2) and placed in a temporary call store 67. At step 120, subscriber lines are monitored to determine off hook conditions. In the event of an off hook condition, the monitor module identifies the line to which a voice responsive chip is responsive, as indicated at step 122. In the embodiment of FIG. 1, wherein each line is associated with a dedicated chip, line identification is made at the SSP from the data signal received from the line monitor.

If detection of an utterance of a stored vocabulary word has been made at step 124, determination is made at step 126 of whether the detected "word" is a "wake-up" command for secretary service. If so, the subscriber line is connected by the switch to the secretary service platform at step 128. If the detection is made while the subscriber line is connected with a remote station during an existing call, the call is bridged to the platform. Both parties then may have access to the platform. After the connection is made to the platform, an interactive session takes place, step 130, wherein the subscriber, or the remote party, may utilize the functions offered by the service platform. As indicated previously, these functions may include calendar and scheduling, message retrieval, format conversion, and outdialing. At step 132 determination is made when a session with the service platform is completed.

If the detected "word" is not a command for platform service as determined at step 126, in this example, a command for addition of a switch class feature is represented, inasmuch as all other required functions would be realized through the service platform. The module processor correlates the detected word with its associated switch class feature at step 134. A signal is then generated and transmitted to the SSP to add the feature to the subscriber profile for the call, at step 136. The arrangement may be modified to provide other functions through the SSP and switch without accessing the service platform. Recognition of commands for such functions can take place in the monitor module with generation of appropriate signaling to the SSP.

The invention as described above thus provides the subscriber with a user activated dynamic line translation capability. If, for example, a subscriber who does not normally use three way calling and does not subscribe to this feature finds the need for this feature during a given call, the switch can immediately be activated to respond to a three way call request. The subscriber is spared the expense of subscribing on a permanent basis for a class feature that will only rarely be used. With access to the personal secretary service platform provided to the subscriber on an on-demand basis, more efficient use of the platform is available as it will not be on line at all times.

Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein. For example, the service platform to which the subscriber is bridged may serve functions other than secretarial functions.

We claim:

1. In a public switched telephone network comprising a plurality of subscriber telephone lines, each coupled to an associated telephone switching facility, the improvement comprising:

a processor coupled to said network;

a voice recognition monitor coupled to one of said subscriber telephone lines for signaling to the telephone switching facility in response to recognition of a predetermined utterance whenever said one subscriber line is in an off-hook state;

bridging means in said telephone switching facility for bridging said one subscriber line to said processor in response to receipt of signals from said voice recognition monitor.

2. In a public switched telephone network comprising a plurality of subscriber telephone lines, each coupled to an associated telephone switching facility, the improvement comprising:

a processor coupled to said network;

a voice recognition monitor coupled to one of said subscriber telephone lines for signaling to the telephone switching facility in response to recognition of a predetermined utterance when said one subscriber line is in an off-hook state;

bridging means in said telephone switching facility for bridging said one subscriber line to said processor in response to receipt of signals from said voice recognition monitor;

wherein said voice recognition monitor is coupled to said one line between subscriber location and telephone switching facility and is connected to said switching facility by a data link for transmitting data signals from said monitor to said switching facility.

3. A network as recited in claim 1, wherein said voice recognition monitor is connected to a main distribution frame at said switching facility and is adapted to monitor a plurality of said lines.

4. A network as recited in claim 1, wherein said processor comprises a platform having storage means associated with a plurality of subscriber lines.

5. A network as recited in claim 4, wherein said processor includes scheduling means for maintaining a calendar of events.

6. A network as recited in claim 1, wherein said processor includes dial out means for initiating a switching facility to connect said one subscriber line to a remote subscriber line.

7. A network as recited in claim 1, wherein said processor comprises 3-way call set-up means.

8. A network as recited in claim 4, wherein said processor comprises voice interactive response means.

9. A network as recited in claim 8, wherein said processor includes message storage means for storing messages associated with respective subscribers in any of a plurality of formats.

10. A network as recited in claim 8, wherein said processor comprises text to speech conversion means.

11. A network as recited in claim 3, wherein said switching facility comprises an administrative module and said voice recognition monitor includes a processor coupled by a data link to said administrative module.

12. A network as recited in claim 11, wherein said processor included in said voice recognition monitor is responsive to recognition of speech on said one subscriber line to modify a subscriber profile stored at said switching facility prior to said one subscriber line attaining an on-hook state.

13. In a public switched telephone network comprising a plurality of subscriber telephone lines, each coupled to an associated telephone switching facility, the improvement comprising:

a processor coupled to said network;

a voice recognition monitor coupled to one of said subscriber telephone lines for signaling to the telephone switching facility in response to recognition of a predetermined utterance whenever said one subscriber line is in an off-hook state;

means responsive to receipt of signals from said voice recognition monitor for changing a subscriber profile table associated with said one subscriber line that is temporarily stored in said switching facility during an existing phone call.

14. A network as recited in claim 13, wherein said profile table comprises a compilation of switch features available for respective subscriber lines and said table is changed by the addition of at least one new switch feature.

15. A network as recited in claim 14, wherein said one new switch feature is a conference call feature.

16. In a public switched telephone network comprising a plurality of subscriber telephone lines, each coupled to an associated telephone office switch, a method for accessing a personal secretary service platform, comprising the steps of:

monitoring a subscriber line whenever it is in an off-hook state for a predetermined utterance by a user of a telephone connected to said subscriber line;

detecting said predetermined utterance;

in response to said step of detecting, generating a wake-up signal for accessing the personal secretary service platform; and applying said wake-up signal to said switch to activate a switch function while said subscriber line remains in the off-hook state.

17. A method as recited in claim 16, wherein said switch function comprises bridging said subscriber line with a personal secretary platform.

18. A method as recited in claim 16, wherein said switch function comprises establishing a three way conference call.

19. A method as recited in claim 16, wherein said switch function comprises changing a line translation table that is stored in said switch.

20. A method as recited in claim 19, wherein said translation table is changed to add a conference call feature.

21. A method as recited in claim 16, wherein said step of generating is responsive to speech originating only at said subscriber line.

22. A method as recited in claim 16, further comprising authenticating a caller from a line remote from said subscriber line and wherein said step of generating is responsive to speech originating from said remote line only after occurrence of said authenticating step.

23. In a public switched telephone network including a central office switching system, a subscriber telephone line connected to said central office switching system, a voice recognition monitor associated with said subscriber telephone line, and a secretary service platform associated with said central office switching system, a method comprising the steps of:

monitoring said subscriber telephone line for predetermined utterances at all times that said subscriber telephone line is in an off-hook state;

detecting one of said predetermined utterances;

generating an activation signal in response to said detecting step; and establishing a telephone connection between said secretary service platform and said subscriber telephone line in response to said activation signal.

24. The method of claim 23, wherein the monitoring step includes:

monitoring said subscriber telephone line for said predetermined utterances during the presence of a dial tone.

25. The method of claim 23, wherein the monitoring step includes:

monitoring an ongoing call on said subscriber telephone line for said predetermined utterances.

26. The method of claim 23, including at least one of following steps:

maintaining a calendar;

receiving messages;

scheduling appointments; and arranging calls to one or more parties.

27. The method of claim 23, including the step of:

changing a programmed switch feature after a call has been connected to a dialed destination.

28. A public switched telephone network comprising:

a central office switching means;

a multiservice platform means for performing personal secretary functions;

means for monitoring a subscriber telephone line for predetermined utterances whenever said subscriber telephone line is in an off-hook state, said monitoring means including:

means for detecting any one of said predetermined utterances, and means for generating an access signal for accessing said multiservice platform means in response to one of said detected utterances; and means for establishing a telephone connection between said multiservice platform means and said subscriber telephone line in response to said access signal.

29. The network of claim 28, wherein said personal secretary functions include:

maintaining a calendar;

receiving messages;

scheduling appointments; and arranging conference calls.

30. The network of claim 28, wherein said multiservice platform is an intelligent peripheral (IP) having resources that are shared for personal secretary functions and other subscriber functions.

31. The network of claim 28, wherein said means for monitoring is located at the subscriber premises.

32. The network of claim 31, further comprising:

data link means for sending said access signal from said monitor means to said central office switching means.

33. The network of claim 28, wherein said means for monitoring is located at said central office switching means.

34. The network of claim 28, wherein said means for detecting said predetermined utterances comprises a voice recognition chip.

* * * * *